United States Patent
Heen et al.

(10) Patent No.: US 9,462,449 B2
(45) Date of Patent: Oct. 4, 2016

(54) METHOD AND DEVICE FOR FINGERPRINTING OF WIRELESS COMMUNICATION DEVICES

(75) Inventors: Olivier Heen, Domloup (FR); Christoph Neumann, Rennes (FR); Stephane Onno, Saint Gregoire (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/988,529

(22) PCT Filed: Nov. 23, 2011

(86) PCT No.: PCT/EP2011/070830
§ 371 (c)(1),
(2), (4) Date: May 21, 2013

(87) PCT Pub. No.: WO2012/069544
PCT Pub. Date: May 31, 2012

(65) Prior Publication Data
US 2013/0242795 A1    Sep. 19, 2013

(30) Foreign Application Priority Data
Nov. 25, 2010  (EP) .................................... 10306294

(51) Int. Cl.
*H04W 24/00* (2009.01)
*H04W 80/04* (2009.01)
(Continued)

(52) U.S. Cl.
CPC .......... *H04W 8/005* (2013.01); *H04L 63/1425* (2013.01); *H04W 12/12* (2013.01)

(58) Field of Classification Search
CPC ... H04W 24/00; H04W 80/04; H04W 84/12; H04W 84/18; H04W 88/06
See application file for complete search history.

(56) References Cited

U.S. PATENT DOCUMENTS

2004/0252837 A1\* 12/2004 Harvey et al. ............... 380/270
2005/0135409 A1\*  6/2005 Janczak ....................... 370/449
(Continued)

FOREIGN PATENT DOCUMENTS

JP    2005318487    11/2005
JP    2010527208     8/2010

OTHER PUBLICATIONS

J. Franklin; D. McCoy; P. Tabriz; V. Neagoe; J. V. Randwyk; D. Sicker: "Passive Data Link Layer 802.11 Wireless Device Driver Fingerprinting", Security 06, Aug. 2006, pp. 167-178, XP002669055.

(Continued)

*Primary Examiner* — Andrew Lee
(74) *Attorney, Agent, or Firm* — Myers Wolin LLC

(57) ABSTRACT

A method for fingerprinting wireless devices and a method for using a device fingerprint for identifying wireless devices. A monitoring station listens to a channel. For each received frame, the station measures the inter-arrival time from the end of the previously received frame to the end of the present frame. If possible, the station obtains the identity of the sender of the frame. If the sender is known, then the station stores the inter-arrival time in a histogram for the sender; the histogram becomes the fingerprint for the sender. Identification of a device begins by obtaining a number of inter-arrival times for an unknown sender and then matching these to stored fingerprints using a suitable similarity measure. The invention is particularly suitable for IEEE 802.11 and may for example be used to detect so-called MAC spoofing and as an additional layer of an identification protocol.

18 Claims, 4 Drawing Sheets

(51) Int. Cl.
  *H04W 84/12* (2009.01)
  *H04W 8/00* (2009.01)
  *H04L 29/06* (2006.01)
  *H04W 12/12* (2009.01)

(56) References Cited

U.S. PATENT DOCUMENTS

| | | | |
|---|---|---|---|
| 2005/0220145 | A1 | 10/2005 | Nishibayashi et al. |
| 2008/0022402 | A1* | 1/2008 | Francfort et al. ............... 726/22 |
| 2008/0119130 | A1* | 5/2008 | Sinha ................................ 455/1 |
| 2008/0244707 | A1* | 10/2008 | Bowser et al. ................... 726/4 |
| 2009/0003282 | A1 | 1/2009 | Melyan et al. |
| 2011/0149789 | A1* | 6/2011 | Edge ............................ 370/252 |
| 2011/0310735 | A1* | 12/2011 | Karagiannis et al. ......... 370/232 |
| 2012/0033581 | A1* | 2/2012 | Torres Ramon et al. ..... 370/253 |
| 2012/0309427 | A1* | 12/2012 | Harvey et al. ............. 455/456.5 |
| 2013/0139263 | A1* | 5/2013 | Beyah et al. .................... 726/23 |
| 2013/0237246 | A1* | 9/2013 | Aggarwal et al. .......... 455/456.1 |
| 2013/0293386 | A1* | 11/2013 | Raniere ....................... 340/686.6 |

OTHER PUBLICATIONS

D.C.C. Loh; C.Y. Cho; C.P. Tan; R.S. Lee: "Identifying Unique Devices through Wireless Fingerprinting", WISEC '08, Apr. 2008, XP002669056.
Search Report Dated Feb. 28, 2012.
Feng et al., "Statistical Analysis of Packet Interarrival Times in Wireless LAN", International Conference on Wireless Communications, Networking and Mobile Computing 2007, Shanghai, China, Sep. 21, 2007, pp. 1888-1891.
Berger-Sabbatel et al., "Interarrival Histograms: A Method for Measuring Transmission Delays in 802.11 WLANs", Research report, LIG Lab, Grenoble, France, Oct. 2007, pp. 1-14.
Arackaparambil et al., "On the Reliability of Wireless Fingerprinting Using Clock Skews", In Proceedings of ACM WiSec 10, Hoboken, New Jersey, USA, Mar. 22, 2010, pp. 1-6.
Bratus et al., "Active Behavioral Fingerprinting of Wireless Devices"; In Proceedings of ACM WiSec'08, Alexandria, Virginia USA, Mar. 31, 2008, pp. 1-6.
Cache J., "Fingerprinting 802.11 Devices"; Master Thesis, US Naval Post-graduate School, Sep. 2006, pp. 1-50.
Gopinath et al. "An Empirical Analysis of Heterogeneity", In Proceedings of ACM WiNTECH'06, Los Angeles California, USA, Sep. 29, 2006, pp. 80-87.
Gua et al., "Sequence Number-Based MAC Address Spoof Detection", In Proceedings of RAID 2005, Seattle, Washington, USA, Sep. 7, 2005, pp. 309-329.
Jana et al., "On Fast and Accurate Detection of Unauthorized Wireless Access Points Using Clock Skews;" In Proceedings of ACM MobiCom 08, San Francisco, California, USA, Sep. 14, 2008, pp. 1-12.
Pang et al., "802.11 User Fingerprinting", In Proceedings of ACM MobiCom'07, Montreal, Quebec, Canada, Sep. 9, 2007, pp. 99-110.
Wright, J., "Detecting Wireless LAN MAC Address Spoofing", http://home.jwu.edu/jwright, Jan. 21, 2003, pp. 1-20.
Anonymous, "Aircrack-NG", http://www.aircrack-ng.org/, Sep. 24, 2010, pp. 1.
Anonymous, "Airsnarf—A rogue AP setup utility", http://airsnarf.shmoo.com/, May 17, 2008, pp. 1-2.
Anonymous, "Crawdad—A Community Resource for Archiving Wireless Data at Dartmouth", http://crawdad.cs.dartmouth.edu/, Oct. 31, 2010, pp. 1-2.
IEEE Standard 802.11a-1999, "Supplement to IEEE Standard for Information Technology, Part 11: Wireless Lan Medium Access Control (MAC) and Physical Layer (PHY) Specifications: High-Speed Physical Layer in the 5 Ghz Band", IEEE-SA Standards Board, Sep. 16, 1999, pp. 1-90.
Liberatore et al., "Inferring the Source of Encrypted HTTP Connections", 13th ACM Conference on Computer and Communications Security, Alexandria, Virginia, USA, Oct. 30, 2006, pp. 1-9.
Anonymous, "Radiotap", http://www.radiotap.org/, May 19, 2008, pp. 1-4.
Butti, L., "Raw Wireless Tools Homepage", http://rfakeap.tuxfamily.org/, Sep. 28, 2006, pp. 1-4.
Anonymous, "TCPDUMP & LIBPCAP", http://www.tcpdump.org/, Apr. 28, 2010, pp. 1-2.
Anonymous, "CloudCracker: Online Hash Cracker", https://www.wpacracker.com/, Jan. 1, 2012, pp. 1-2.
Doychev, G., "Speaker Recognition in Encrypted Voice Streams" Bachelor Thesis, Department of Computer Science, Saarland University, Dec. 18, 2009, pp. 1-43.

* cited by examiner

METHOD AND DEVICE FOR FINGERPRINTING OF WIRELESS COMMUNICATION DEVICES

This application claims the benefit, under 35 U.S.C. §365 of International Application PCT/EP2011/070830, filed Nov. 23, 2011, which was published in accordance with PCT Article 21(2) on May 31, 2012 in English and which claims the benefit of European patent application No. 10306294.9, filed on Nov. 25, 2010.

TECHNICAL FIELD

The present invention relates generally to device fingerprinting and in particular to the fingerprinting of wireless communication devices.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

For the purposes of the present invention device fingerprinting means gathering information about a device in order to characterize it. This process yields a signature, also called fingerprint, which describes the device's observed features in a compact form. If the generated signature is distinctive enough, it may be used to identify the device.

The description will be focused on fingerprinting devices that implement the standard for wireless communication called IEEE Standard for Information technology—Telecommunications and information exchange between systems—Local and metropolitan area networks—Specific requirements Part 11: Wireless LAN Medium Access Control (MAC) and Physical Layer (PHY) Specifications; for short called IEEE 802.11 and defined in IEEE Std 802.11-1999 (hereinafter 802.11). This standard is for example used by WiFi. It will however be appreciated that the invention may also be used to fingerprint devices that implement other suitable communication techniques, such as for example ALOHA.

As already mentioned, device fingerprinting enables identification of devices, an identification that is independent of the purported identity of the device. A primary application of 802.11 device fingerprinting is the prevention of Media Access Control (MAC) address spoofing. This refers to the action of usurping the MAC address of another device in order to benefit from its authorization.

In several scenarios, the prevention of MAC address spoofing is of importance: Open wireless networks such as hot-spots often implement MAC address based access control in order to guarantee that only legitimate client stations (e.g. the devices that has purchased Internet access) connect to the access points. Attackers may then want to steal a legitimate device's session by spoofing the latter's MAC address. Conversely, the access points may be subject to attacks: tools like AirSnarf and RawFakeAP enable an attacker to set up a rogue access point, which could make client stations connect to the fake AP instead of the genuine one. A good fingerprinting method should be able to detect above attacks so that countermeasures may be taken.

In fact, it can make sense to use fingerprint signature verification even in wireless networks protected by a key, e.g. Wi-Fi Protected Access (WPA). A passive fingerprinting method may be used prior to the key-based authentication mechanism as an additional layer of trust, which may detect unauthorized devices and thus render pointless the active, possibly more vulnerable and costly, key-based authentication mechanism. Fingerprinting may also be used after the wireless authentication mechanism in order to control that only authorized devices are in the network. Indeed, keys may leak as there are several normal situations in which users voluntarily give out their Wi-Fi key. For instance, when inviting a friend and allowing his laptop to access the home network. While this scenario is both common and simple, it also endangers the home network; the key may later leak from the invited laptop or the friend may abusively reconnect. Finally, tools exist that allow hackers to crack the WEP protocol, which is known to be insecure, and there are currently existing services, e.g. WPA Cracker, that try to discover WPA keys.

The prior art comprises a number of solutions for fingerprinting wireless devices by analyzing implementation specificities of the network card and/or driver.

Franklin et al. characterize the drivers during the "active scanning period" where the card is searching for available wireless network. This searching process is underspecified in the 802.11 standard regarding the frequency and order of sending probe requests. Each manufacturer therefore implements its own algorithm and timers during this period. See J. Franklin, D. McCoy, P. Tabriz, V. Neagoe, J. V. Randwyk, and D. Sicker; "Passive Data Link Layer 802.11 Wireless Device Driver Fingerprinting"; In *Proceedings Usenix Security* 06, August 2006. A major drawback of this passive fingerprinting technique is that it only works during a short and specific period at the start of the wireless protocol. A similar solution is found in D. C. C. Loh, C. Y. Cho, C. P. Tan and R. S. Lee, "Identifying Unique Devices through Wireless Fingerprinting", In WiSec'08, April 2008.

Gopinath et al. show that the 802.11 cards exhibit very heterogeneous behavior which are due to implementation specificities. They tested a set of 802.11 features such as Random Back-off timers and Virtual Carrier Sensing (NAV mechanism). The authors indicate that the observed heterogeneity in behavior may be used to fingerprint a card's vendor and model. See K. Gaopinath, P. Bhagwat, and K. Gopinath; "An Empirical Analysis of Heterogeneity in IEEE 802.11 MAC Protocol Implementations and Its Implications"; In *Proceedings of ACM WiNTECH'06*, September 2006. However, the paper does not further analyze this aspect and just presents bare experimental results.

Bratus et al. propose a method that uses the above work and performs actual fingerprinting of wireless client stations and access points. According to their method, malformed or non-standard stimulus frames are sent to the device to be fingerprinted and a decision tree is applied to the response or behavior of the device in order to fingerprint the vendor/manufacturer. See S. Bratus, C. Cornelius, D. Kotz, and D. Peebles; "Active Behavioral Fingerprinting of Wireless Devices"; In *Proceedings of ACM WiSec'08*, March 2008. A main drawback of this technique is that it is active, not passive.

Cache proposes two methods for fingerprinting a device's network card and driver; see J. Cache; "Fingerprinting 802.11 Devices"; Master Thesis, 2006. The first method is active and uses the 802.11 association redirection mechanism, which even if well specified in the 802.11 standard, is very loosely implemented in the tested wireless cards. As a consequence each wireless card behaves differently during this phase which allows characterization. The second method is passive and based on analysis of duration field values in 802.11 data and management frames. Each wireless card computes the duration field slightly differently yielding different duration values.

Common to all of the approaches hereinbefore is that they cannot differentiate between two devices using the same network card and driver. These approaches may thus for example not be used for detecting MAC address spoofing and even less order to identify the devices.

In contrast to the papers hereinbefore, Pang et al. discuss privacy implications of 802.11. Their paper highlights that users are not anonymous when using 802.11 as the protocol uses globally unique identifiers (i.e. the MAC addresses) that allows user tracking. Even if this identifier is masked—e.g. by temporarily changing addresses—it is still possible to track users by observing a set of parameters (used as implicit identifiers) in the 802.11 protocol. The authors apply a naive Bayes classifier on four implicit identifiers, namely network destinations, network names advertised in 802.11 probes, 802.11 configuration options and broadcast frame sizes. Three out of the four parameters apply even when the traffic is encrypted. Using busy hot spot test traces, they could identify 64% of users with 90% accuracy.

Other prior art documents deal with the fingerprinting of wireless access points (APs). Jana et al. calculate the clock skews of access points in order to identify them. The clock skews are calculated using the Timestamps contained in Beacon/Probe response frames emitted by the AP. An attacker that replays the clock skew is subject to the 802.11 protocol timers such as the DIFS (Distributed coordination function Interframe Space) which changes the actual time the beacon is sent. As those timers are not accessible from the driver level (where the attack is implemented), the timestamps and receiving times do not correspond, which changes the measured clock skew. Their proposed method is able to measure those differences and therefore detect the attack. See S. Jana and S. K. Kasera; "On Fast and Accurate Detection of Unauthorized Wireless Access Points Using Clock Skews;" In *Proceedings of ACM MobiCom* 08, September 2008.

C. Arackaparambil et al. refine the work of Jana et al. and propose a new method yielding more precise clock measures. They also successfully spoof an AP, making it indistinguishable from a 'real' AP by the methods used by Jana et al. Their method uses the fact that wireless cards automatically synchronize with the attached AP (which makes the wireless card having the same clock skew than the AP). This makes it easier to spoof an AP by associating with the AP prior to the attack. See C. Arackaparambil, S. Bratus, A. Shubina, and D. Kotz; "On the Reliability of Wireless Fingerprinting Using Clock Skews"; In *Proceedings of ACM WiSec* 10, March 2010.

The methods of Jana et al. and Arackaparambil et al. are however only applicable to access points as they require the timestamps included in the 802.11 beacon frames which are only sent by access points and not by client stations.

Finally, for completeness, two papers tackle the problem of MAC address spoofing, but do not engage in any fingerprinting. Both papers detect discontinuities in 802.11 frame sequence numbers in order to detect potential address spoofing. See J. Wright, "Detecting Wireless LAN MAC Address Spoofing"; Technical Report, 2003 and F. Gua and T. Chiueh, "Sequence Number-Based MAC Address Spoof Detection; In *Proceedings of RAID* 2005, September 2005.

It will therefore be appreciated that there is a need for a solution that can enable passive fingerprinting and individual identification of wireless devices. The present invention provides such a solution.

SUMMARY OF INVENTION

In a first aspect, the invention is directed to a method of fingerprinting at least one wireless device transmitting data in frames on a channel, wherein frames transmitted in succession on the channel. A device, listening to the channel, receives a current frame that succeeds a preceding frame; measures an inter-arrival time from the end of reception of the preceding frame to the end of reception of the current frame; obtains, if possible, an identity of the wireless device that transmitted the current frame; and if the identity was obtained, stores the inter-arrival time in a set of inter-arrival times for the wireless device corresponding to the obtained identity in order to generate a fingerprint for the wireless device.

In a first preferred embodiment, the device arranges the set of inter-arrival times as a histogram that constitutes the fingerprint for the wireless device. It is advantageous that the histogram is expressed as a percentage frequency distribution. It is also advantageous that the histogram comprises bins that correspond to specific times defined by a standard used for communication over the channel. The standard is advantageously IEEE 802.11, in particular IEEE 802.11g, and the first bin corresponds to the Short Interframe Space (SIFS), the second bin corresponds to the Distributed coordination function Interframe Space (DIFS) minus the SIFS, and at least a third and a fourth bin, each corresponding to the length of a timeslot (aSlotTime).

In a second preferred embodiment, the obtained fingerprint is compared with stored fingerprints and the wireless device is identified as the device whose stored fingerprint the obtained fingerprint resembles the most. It is advantageous that resemblance is determined using a similarity measure.

In a second aspect, the invention is directed to a device for fingerprinting at least one wireless device transmitting data in frames on a channel, wherein frames are transmitted in succession on the channel. The device comprises means for listening to the channel; means for receiving a current frame that succeeds a preceding frame; means for measuring an inter-arrival time from the end of reception of the previously received frame to the end of reception of the current frame; means for obtaining, if possible, an identity of the wireless device that transmitted the current frame; and means for storing, if the identity was obtained, the inter-arrival time in a set of inter-arrival times for the wireless device corresponding to the obtained identity in order to generate a fingerprint for the wireless device.

In a first preferred embodiment, the device further comprises means for arranging the set of inter-arrival times as a histogram that constitutes the fingerprint for the wireless device. It is advantageous that the arranging means is further for expressing the histogram as a percentage frequency distribution.

In a second preferred embodiment, the device further comprises means for comparing the obtained fingerprint with stored fingerprints; and for identifying the wireless device as the device whose stored fingerprint the obtained fingerprint resembles the most.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
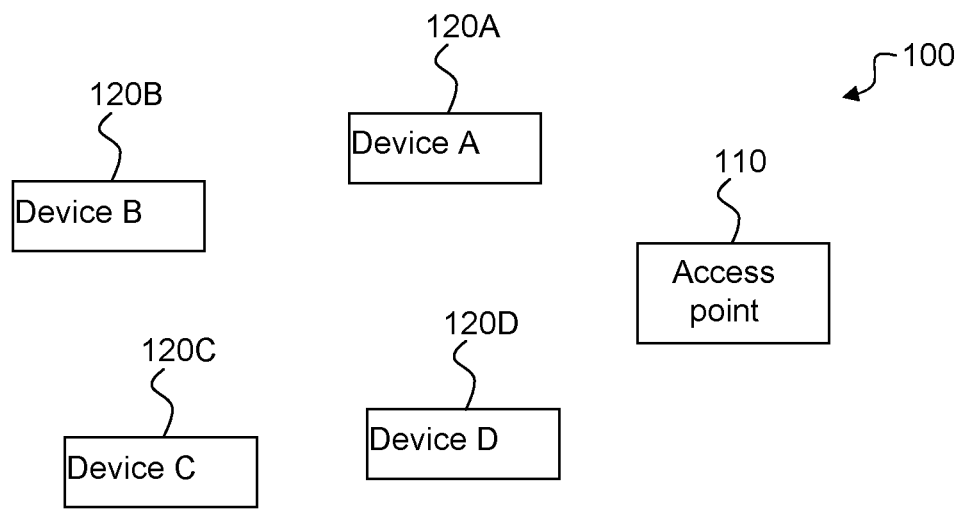
FIG. 1 illustrates an exemplary wireless network in which the present invention may be used.

FIG. 1 illustrates an exemplary wireless network 100 in which the present invention may be used. The wireless network 100 comprises an access point (AP) 110 and a plurality of client devices 120A-D (which may be jointly referred to as 120). The AP 110 is adapted to communicate with the client devices 120 and, for example, provide Internet access to them.

A salient inventive idea of the present invention is to monitor network traffic and measure the frame inter-arrival times for frames sent by each sending wireless device. The wireless trace captured (i.e. received) by a monitoring station (which could be the AP 110 or a client device 120) is given as a sequence $p_0, \ldots, p_n$ of frames. The time of end of reception of a frame $p_i$ is denoted $t_i$ (where $0 \leq i \leq n$) and frames are increasingly ordered according to the reception time (i.e. $\forall i: t_{i-1} < t_i$). Frame $p_i$ is sent by sender $s_i$, and the sender is considered to be unknown for frames with a frame type that does not include a sender address or a transmitting address (such as ACK frames and Clear-to-send frames); in the latter case $s_i$=null. For each frame $p_i$, the interval $T_i = t_i - t_{i-1}$ is measured, i.e. the difference between the time of end of reception of frame $p_{i-1}$ and the time of end of reception of succeeding frame $p_i$. The measured time interval $T_i$ is then added to the set $I(s_i)$ for the sender $s_i$, where $I(s_i)$ denotes the set of inter-arrival times measured for sending device $s_i$. $|I(s_i)|$ is the number of observations for device $s_i$.

To collect the traces, it suffices for the monitoring station to have a standard 802.11 wireless card that listens in monitoring mode on the 802.11 channel of interest. It will be appreciated that the method of the present invention is completely passive; no additional traffic is generated. It is, for example, possible to generate the capture traces using the so-called pcap library (see TCPDump and Libpcap; http://tcpdump.org) on the monitoring device. As can be seen, this monitoring setting has very small requirements.

Figure 2:
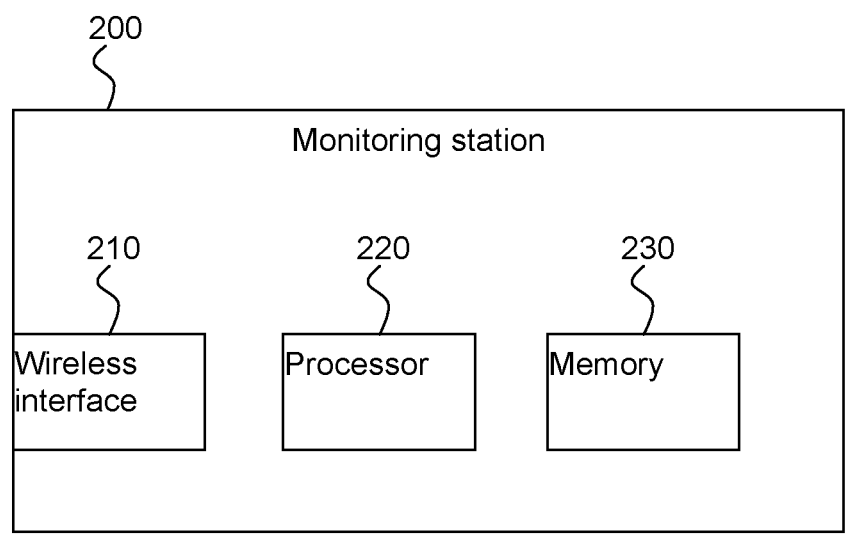
FIG. 2 illustrates an exemplary monitoring station according to a preferred embodiment of the present invention.

FIG. 2 illustrates an exemplary monitoring station according to a preferred embodiment of the present invention. The monitoring station 200 comprises a wireless interface 210, such as the mentioned 802.11 wireless card, at least one processor 220 (hereinafter "processor") and memory 230. The wireless interface 210 is adapted to monitor wireless traffic, the processor 220 is adapted to analyse the monitored traffic by, as will be seen in further detail hereinafter, measuring frame inter-arrival times and detecting the sender, and the memory 230 is adapted to store data such as device fingerprints. The processor 220 is further adapted to compare received traffic in order to identify a sending device. Only the features necessary for the comprehension of the invention are detailed; it will be understood that the monitoring station 200 further comprises internal connections and possibly, for example, a further (wire-based) communication interface and a user interface.

Figure 3:
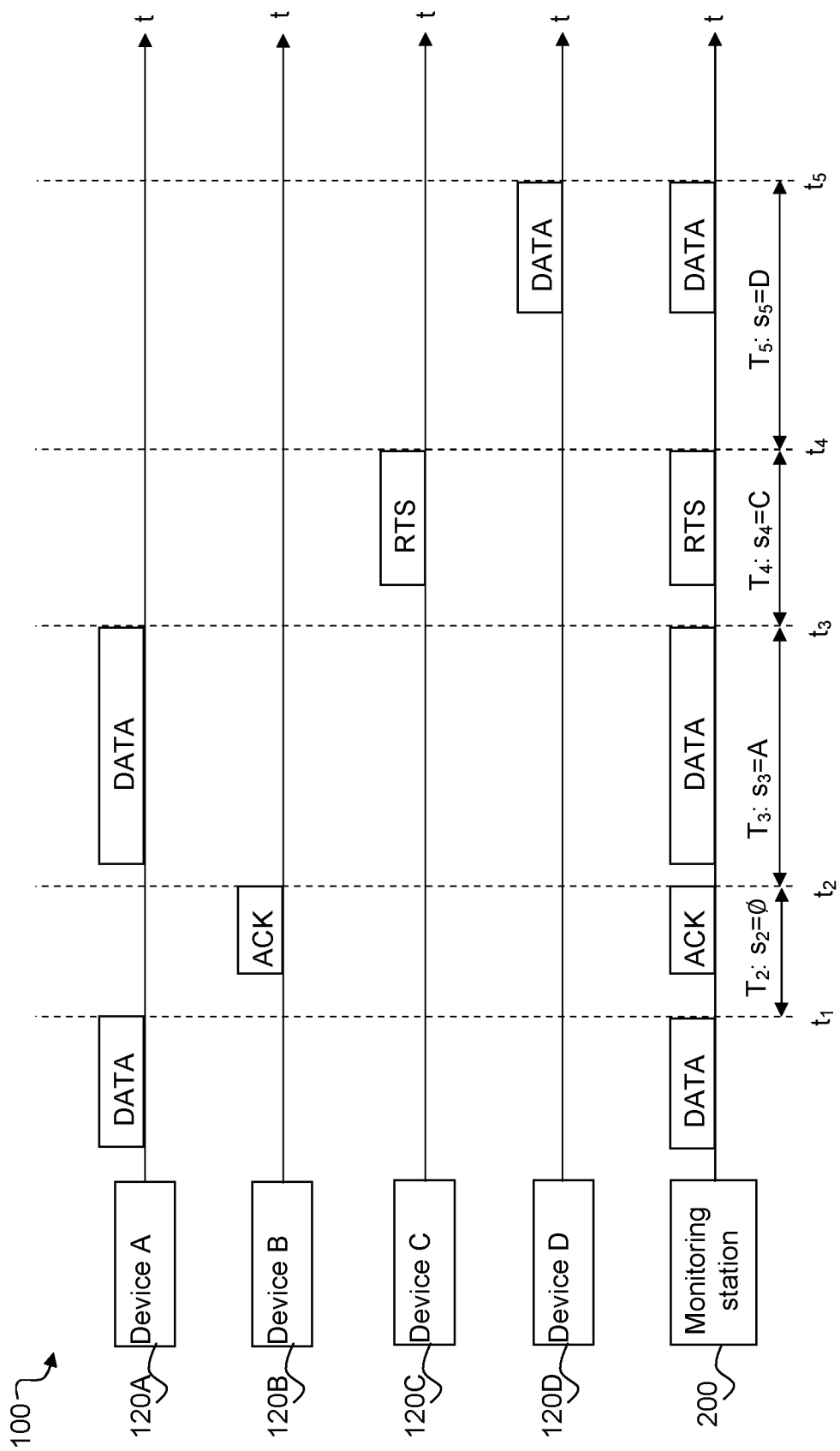
FIG. 3 illustrates an example of network traffic monitoring according to a preferred embodiment of the present invention.

FIG. 3 illustrates an example of network traffic monitoring according to a preferred embodiment of the present invention. The four client devices 120 have been joined in the network 100 by the monitoring device 200. In FIG. 3, the propagation time has been neglected, as it is almost zero for the small distances in the network; a frame is thus shown to arrive exactly when it is transmitted. It will also be appreciated that normally only a single frame (or no frame at all) is sent in the network at a given time (i.e. on the channel that the devices use); there is thus a succession of frames on the channel.

At first, device A 120A sends a data frame until time $t_1$. However, as the monitoring device 200 did not capture any previous frame, it cannot calculate the inter-arrival time. Then device B 120B sends an acknowledgement (ACK) that ends at time t2. The monitoring device 200 can calculate the inter-arrival time $t_2$, but it cannot determine the sender, so $s_2$ is not set (i.e. null) and the inter-arrival time is ignored.

Device A 120A then sends another frame of data, ending at t3. The monitoring device 200 calculates the inter-arrival time $T_3 = t_3 - t_2$ and sets $s_3$=A. Similarly, device C 120C sends a Request to Send (RTS) enabling the calculation of $T_4 = t_4 - t_3$ and $s_4$=C; and device D 120D sends a data frame enabling the calculation of $T_5 = t_5 - t_4$ and $s_5$=D.

At this point $I(A) = \{T_3\}$, $I(B) = \{null\}$, $I(C) = \{T_4\}$, and $I(D) = \{T_5\}$. Naturally, there would normally be many more captured frames, but the number has been kept to a minimum for reasons of clarity. It will be appreciated that these sets $I(s_i)$ in fact are fingerprints for the corresponding devices (keeping in mind that the sets normally comprise many more observations). However, the fingerprint is much easier to visualize and also to compare when it is expressed as a histogram, as will be further described hereinafter.

The monitoring station 200 uses these measurements to generate an inter-arrival time histogram for each emitting station. Each histogram comprises the bins $b_0, \ldots, b_k$, where each bin corresponds to a time interval of inter-arrival times. The number of observations in a bin $b_j$ is denoted $m_j$ (where $0 \leq j \leq k$). The histogram may then be converted into a percentage frequency distribution, where the percentage frequency of bin $b_j$ is $P_j = m_j/|I(S)|$. A signature for wireless device S may then be defined as $Sig(S) = \{P_j; \forall j \in 0 \leq j \leq k\}$.

It should be noted that there is a risk that two devices begin simultaneous transmission of frames on the channel, resulting in a corrupted frame. In this case, a Carrier sense multiple access with collision avoidance (CSMA/CA) mechanism defined by the standard makes the transmitting devices 'back off' and retransmit later. There are, at least, two embodiments for how the monitoring station 200 should handle corrupt frames. A first embodiment is to perform the measurement from the end of reception of the corrupt frame when calculating the inter-arrival time of the succeeding frame; in a variant, the inter-arrival time for the corrupt frame itself is ignored, while this inter-arrival time is counted for each transmitting device in another variant if it is possible to obtain the identities. A second embodiment is to simply ignore the corrupt frame and consider the latest 'correct' (i.e. non-corrupt) frame as the preceding frame for the next 'correct' frame.

Figure 4:
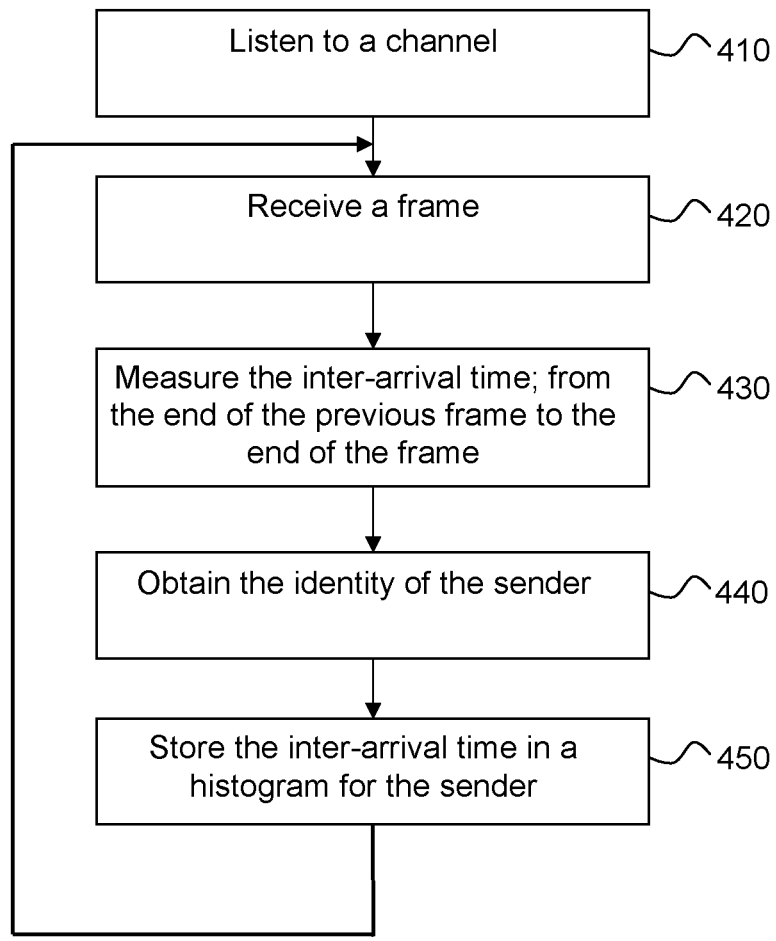
FIG. 4 illustrates a flow chart of the fingerprinting method according to a preferred embodiment of the present invention.

FIG. 4 illustrates a flow chart that summarizes the fingerprinting method just described. The monitoring station 200 begins by listening 410 to a channel. When it receives 420 a frame, it measures 430 the inter-arrival time from the end of reception of the preceding frame to the end of reception of the present frame. If possible, it also obtains 440 the identity of the sender of the frame. If this identity is obtained, then the inter-arrival time is stored 450 in a histogram for the sender. This is repeated as long as is deemed fit. The fingerprinting is advantageously continuous, but it can also be limited in time, for example to a specific time or a specific number of received frames, either for the channel as a whole or for a specific transmitting device.

The histogram bins are preferably aligned with some time intervals defined by the associated communication protocol. For example, the histogram bins of the example illustrated in FIG. 3 advantageously correspond to time intervals defined by the 802.11 standard, which requires that before transmission, an emitting station listen to the communication channel for a certain amount of time to see if it is idle. The emitting station does not transmit any frames during this time. Apart from the DIFS already mentioned hereinbefore, 802.11 also defines the time interval Short Interframe Space (SIFS) and sets the length of each timeslot. The exact values depend on the variant of 802.11; in IEEE Std 802.11™-2007 (herein "802.11g"), SIFS=10 µs, DIFS=28 µs and timeslot sizes aSlotTime=9 µs. SIFS is the shortest time interval during which the channel has to be idle and is used for highest priority transmissions or by stations that has reserved the channel using the so-called virtual carrier sensing mechanism. DIFS is the minimum time interval during which the channel has to be idle for stations using the so-called random backoff procedure. However, as it happens, a station transmits frames at DIFS plus multiples of aSlotTime. Using these times yields a histogram with the first bin $b_0$ of size SIFS, the second bin $b_1$ of size DIFS-SIFS and all the following bins $b_2, \ldots, b_k$ of size aSlotTime.

Figure 5:
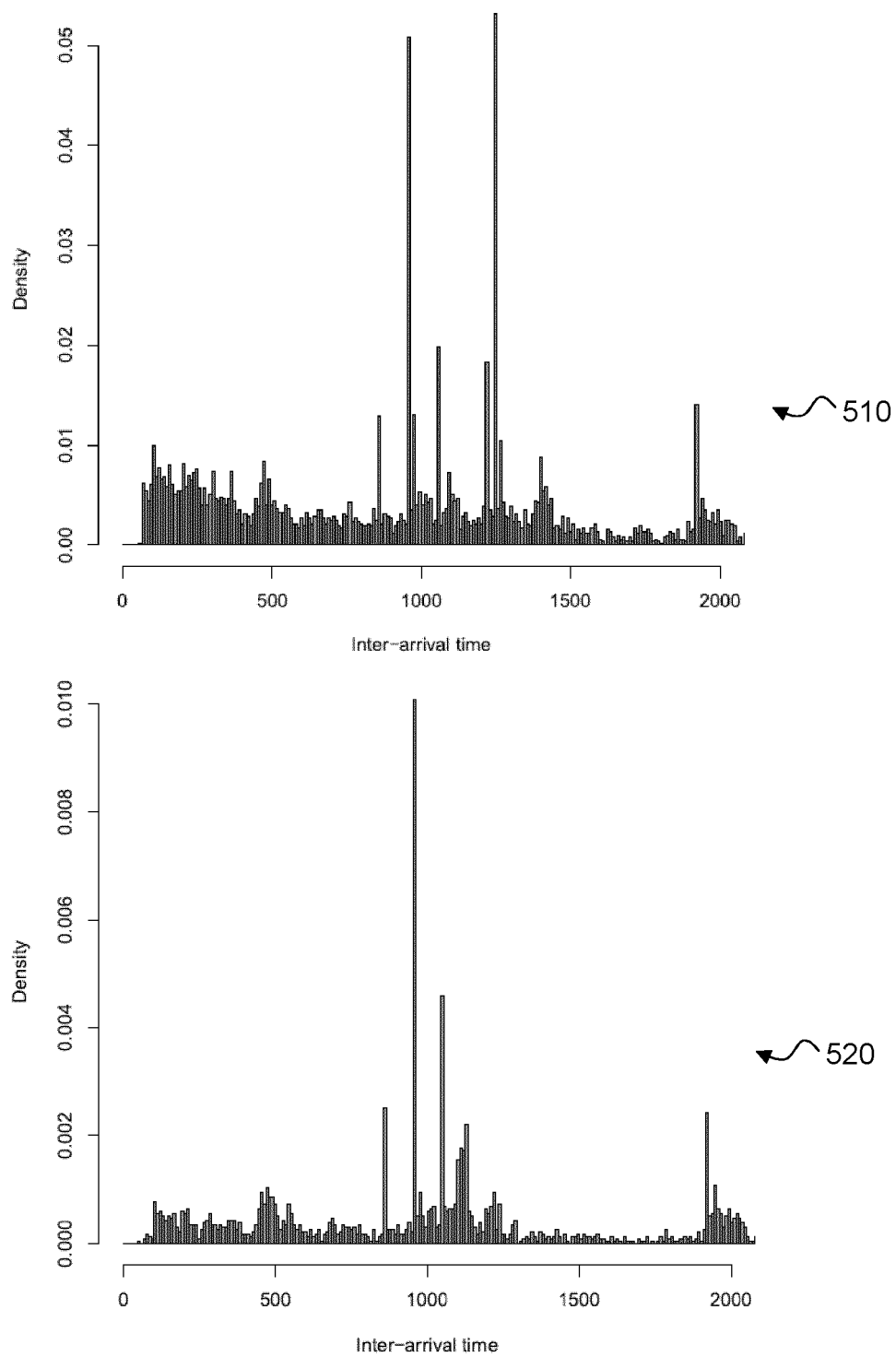
FIG. 5 illustrates exemplary fingerprints generated by a preferred embodiment of the present invention.

FIG. 5 illustrates exemplary histograms 510 and 520 with the bins along the x-axis and the density (i.e. the percentage frequency) along the y-axis. A mere glance at the histograms 510 and 520 suffices to recognize that they are quite different; hence the fingerprints are also different. For instance, histogram 510 has two salient peaks, while histogram 520 only has one. It should also be noted that the scale on the x-axis is the same, but that the y-axis goes from 0 to 0.05 in the top histogram 510 and from 0 to 0.01 in the bottom histogram 520.

The skilled person will note that measurement of the end of reception of a frame, measures both the emitting station's idle period and transmission period. Looking first at the transmission period, a sender starts a transmission by sending so-called Physical Layer Convergence Protocol (PLCP) preambles and headers. These are used for synchronization at the physical layer. Duration and size depend on the used transmission rates and on features of the physical layer, which partly depend on the wireless card and its driver. The sender then transmits the frame's payload, whose transmission duration depends on the transmission rate and the size of the payload. In addition, the frame type, the settings of the wireless card, and the application that generates the frame data influence the size of the frames. Thus, the frame transmission duration depends on a mix of features of the wireless card and on the application that generates the data in the frame. Owing to this dependence, some very characteristic patterns and peaks are generated in the histograms.

If the measurements were made at the start of reception of a frame, this would just measure the idle time, i.e. the time the emitting station waited before transmitting. A signature based solely on this measurement would enable differentiation of a subset of the monitored wireless stations. Implementation specificities of this period in the wireless driver and the wireless card may influence the histogram. Thus, the duration of the idle period depends mainly on the wireless card and its driver. A signature based on this measurement only would not be able to differentiate between two devices that use the same wireless card and driver.

It should be noted that inter-arrival time histograms are also used by Berger-Sabbatel et al, but they however use them to assess the performance of 802.11 devices, not for fingerprinting. In addition, their measurements are only applicable in a completely controlled environment with no or only controlled background traffic. See G. Berger-Sabbatel, Y. Grunenberger, M. Heusse, F. Rousseau, and A. Duda, "Interarrival Histograms: A Method for Measuring Transmission Delays in 802.11 WLANs", Research report, LIG Lab, Grenoble, France, October 2007.

So far, the description has focused on the generation of fingerprints for devices. This generation is also called the learning phase, during which a reference database is populated with fingerprints. The monitoring device 200 stores the generated signatures, i.e. the reference database, in memory 230. It is thus able to obtain the histograms $Sig(ref_i)$ of all its known wireless devices $ref_i$. The reference database is thus generated from one or more training datasets, which may an entire wireless trace or a subset of thereof, from which the histograms are computed for each source address appearing in the trace. The skilled person will appreciate that it is possible for an attacker to pollute the training datasets, in which case the fingerprints may be corrupt.

These fingerprints are normally used in a subsequent detection phase, during which a monitoring device matches unknown wireless devices against the fingerprints in the reference database. The skilled person will appreciate that 'unknown' merely means that there may be a fingerprint for the unknown device in the reference database, but that the monitoring device has yet to identify the unknown device; the unknown device may naturally also be completely unknown, which is the case for example if the monitoring device has never encountered it before.

In the detection phase, a further wireless trace, called a validation dataset, is analyzed in order to extract the signatures $Sig(cand_i)$ for all devices, called candidate devices, appearing in this trace. The signature of each candidate device is compared to the signatures of the reference database. The comparison is performed using at least one similarity measure further described hereinafter. This yields, for each candidate device, a vector of similarities $<sim_1, sim_2, \ldots, sim_N>$, where $sim_i$ represents the similarity of the signature $Sig(cand_i)$ of the unknown device compared to the reference signature of device $ref_i$.

For each candidate device, it may be interesting to resolve the following two problems: proximity and identification.

The proximity test does not try to identify the candidate device exactly. Instead, the fingerprint algorithm returns a set of reference device identifiers to which the similarity $sim_i$ is smaller than a threshold value TV. This can enable fine-tuning of the method, using two accuracy metrics: the true positive rate (TPR) and the false positive rate (FPR). TPR is the fraction of candidate wireless devices known to the reference database for which the returned set contains the candidate device's actual identity. FPR is the fraction of candidate wireless devices not known to the reference database for which the algorithm returned a non empty set of identities.

The identification test presupposes that the proximity test returned a set of reference device identifiers and that the candidate identity is contained in this set. Based on the vector of similarities returned by the previous test, we pick the reference device with the greatest similarity. A suitable accuracy metric for this test is expressed as a detection ratio, i.e. the fraction of wireless devices that have been correctly identified.

There are, of course, many different similarity measures that can be used. Three such similarity measures will be described hereinafter.

Sig(ref)={$P_{ref,j}$; ∀j} denotes the reference signature for device ref and Sig(cand)={$P_{cand,j}$; ∀j} denotes the candidate signature for device cand.

The first similarity measure is a standard L1-similarity based on the L1-distance:

$$sim_{L_1}(Sig(cand), Sig(ref)) = 1 - \frac{\sum_{j=0}^{k} |P_{cand,j} - P_{ref,j}|}{2}$$

If two signatures are identical, then the value equals 1; conversely, it equals 0 if two signatures are entirely opposite.

This is a standard and quite simple measure performs reasonably well.

The second similarity measure is a $\chi^2$-similarity, based on the $\chi^2$-test:

$$sim_{\chi^2}(Sig(cand), Sig(ref)) = 1 - \sum_{j=0}^{k} \frac{(P_{cand,j} - P_{ref,j})^2}{P_{ref,j}}$$

Once again, if two signatures are identical, then the value equals 1. However, it is possible for the second similarity measure to be smaller than 0, i.e. negative. It is thus not, in a strict sense, a similarity measure, but it nevertheless performs well. In particular, owing to the square, this similarity measure gives more weight to some large differences than many small ones, and it also gives more importance to differences whenever $P_{ref,j}$ is small.

The third similarity measure is a Jaccard-similarity, based on the Jaccard-distance.

$$sim_{jacc}(Sig(cand), Sig(ref)) = 1 - \frac{\sum_{j=0}^{k} (P_{cand,j} - P_{ref,j})^2}{\sum_{j=0}^{k} P_{cand,j}^2 + \sum_{j=0}^{k} P_{ref,j}^2 - \sum_{j=0}^{k} P_{cand,j} P_{ref,j}}$$

As with the other similarity measures, this equals 1 if the signatures are identical. If the signatures are completely opposite, then the value is 0.

The skilled person will appreciate that the Jaccard-similarity metric has been used with good results in several trace analysis scenarios. See for example J. Pang, B. Greenstein, R. Gummadi, S. Seshan, and D. Wetherall, "802.11 User Fingerprinting", In *Proceedings of ACM MobiCom '07*, September 2007; and J. Wright, "Detecting Wireless LAN MAC Address Spoofing", Technical Report, 2003.

The skilled person will appreciate that the fingerprinting method described herein can be used in a number of different applications. The method may for example be used to complement the MAC address based access control that is often implemented, in particular in home networks. It may also be used to detect rogue access points, i.e. access points that purport being a genuine access point. Another example is as a way of locating and tracking devices.

The skilled person will also appreciate that as the fingerprinting method can be implemented quite easily without the need for special equipment, it may be implemented by 'normal' user devices such as PCs, mobile phones, gateways in home networks and so on.

It will thus be appreciated that the present invention can provide a passive method for fingerprinting wireless devices, in particular those implementing the IEEE 802.11 protocol, and that the method being easy to implement.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method, in a device listening to a channel, of fingerprinting at least one wireless device transmitting data in frames on the channel, wherein frames are transmitted in succession on the channel, the method comprising:
   receiving a current frame that succeeds a preceding frame;
   measuring an inter-arrival time from the end of reception of the preceding frame to the end of reception of the current frame;
   obtaining an identity of the wireless device that transmitted the current frame; and
   storing the inter-arrival time in a set of inter-arrival times for the wireless device corresponding to the obtained identity in order to generate a fingerprint for the wireless device.

2. The method of claim 1, further comprising arranging the set of inter-arrival times as a histogram that constitutes the fingerprint for the wireless device.

3. The method of claim 2, further comprising expressing the histogram as a percentage frequency distribution.

4. The method of claim 2, wherein the histogram comprises bins that correspond to specific times defined by a standard used for communication over the channel.

5. The method of claim 4, wherein the standard is IEEE 802.11.

6. The method of claim 5, wherein the standard is IEEE 802.11g.

7. The method of claim 5, wherein a first bin corresponds to a Short Interframe Space (SIFS), a second bin corresponds to a Distributed coordination function Interframe Space (DIFS) minus the SIFS, and at least a third and a fourth bin, each corresponding to a length of a timeslot.

8. The method of claim 1, further comprising:
   comparing the generated fingerprint with stored fingerprints; and
   identifying the wireless device as the device whose stored fingerprint most resembles the generated fingerprint.

9. The method of claim 8, wherein resemblance is determined using a similarity measure.

10. A device for fingerprinting at least one wireless device transmitting data in frames on a channel, wherein frames are transmitted in succession on the channel, the device comprising:
   a wireless interface configured to:
      listen to the channel; and
      receive a current frame that succeeds a preceding frame;
   a processor configured to:
      measure an inter-arrival time from the end of reception of the preceding frame to the end of reception of the current frame;

obtain an identity of the wireless device that transmitted the current frame; and memory configured to store the inter-arrival time in a set of inter-arrival times for the wireless device corresponding to the obtained identity in order to generate a fingerprint for the wireless device.

11. The device of claim 10, wherein the processor is further configured to arrange the set of inter-arrival times as a histogram that constitutes the fingerprint for the wireless device.

12. The device of claim 11, wherein the processor is configured to express the histogram as a percentage frequency distribution.

13. The device of claim 10, wherein the processor is further configured to compare the generated fingerprint with stored fingerprints; and to identify the wireless device as the device whose stored fingerprint most resembles the generated fingerprint.

14. The device of claim 11, wherein the histogram comprises bins that correspond to specific times defined by a standard used for communication over the channel.

15. The device of claim 14, wherein a first bin corresponds to a Short Interframe Space (SIFS), a second bin corresponds to a Distributed coordination function Interframe Space minus the SIFS, and at least a third and a fourth bin, each corresponding to a length of a timeslot.

16. The device of claim 14, wherein the standard is IEEE 802.11.

17. The device of claim 16, wherein the standard is IEEE 802.11g.

18. The device of claim 13, wherein resemblance is determined using a similarity measure.

\* \* \* \* \*